UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOSITION.

SPECIFICATION forming part of Letters Patent No. 626,732, dated June 13, 1899.

Application filed April 18, 1899. Serial No. 713,455. (No specimens.)

*To all whom it may concern:*

Be it known that I, JOHN H. STEVENS, of the city of Newark, county of Essex, and State of New Jersey, have invented a certain new and useful Pyroxylin Composition of Matter, of which the following is a specification.

Pyroxylin compositions of matter are subject to acid decomposition unless protected by a suitable antacid agent, and such agents are rare. The many forms and applications of pyroxylin compositions require properties, moreover, with which antacid agents often interfere. Among other properties, that of transparency in the products used for lacquers and waterproofing solutions or in solids made in imitation of tortoise-shell, amber, and glass is quite important.

I have invented a new pyroxylin composition of matter which is capable of being used for all the purposes to which these compounds are applied and which at the same time is not subject to acid decomposition. In the absence of pigments it is also capable of forming transparent effects. This new composition of matter consists of pyroxylin associated with strontium butyrate or a strontium salt of butyric acid either with or without solvents or other substances usually employed in these compounds. The strontium butyrate can be readily combined with all solvents of pyroxylin by reason of its ready solubility in alcoholic solvents. Where acetone solutions are used, as in smokeless-powder manufacture, the strontium butyrate can be introduced in wood-spirit solutions.

In treating pyroxylin which is to be used or kept in a dry state the strontium butyrate can be dissolved in water or other liquid which is a non-solvent of pyroxylin, and on the evaporation of such liquid the pyroxylin is left in a dry condition, but thoroughly impregnated with the strontium butyrate, and therefore safer to transport, store, and handle on account of its resistance to acid decomposition.

As to proportions I find that from one per cent. to two per cent., by weight, of the strontium butyrate to the amount of pyroxylin is sufficient. The two per cent. gives the strongest preserving power; but even less than one per cent. can be used with success in cases where the compound is not to be subjected to severe conditions of treatment, such as prolonged or high heat. Again, more than two per cent. can be used; but it is unnecessary and apt to result in a weakening or discoloration of the material as the amount of the butyrate is increased. I do not confine myself to any specific proportions of the strontium butyrate.

The nature and methods of making pyroxylin and its compounds are well known and require no further description.

What I claim, and desire to secure by Letters Patent, is—

1. A new composition of matter consisting of pyroxylin and strontium butyrate, substantially as described.

2. A new composition of matter consisting of pyroxylin, and a solvent of the same, associated with strontium butyrate, substantially as described.

3. A new transparent composition of matter consisting of pyroxylin and strontium butyrate, substantially as described.

4. A new transparent composition of matter consisting of pyroxylin, and a solvent of the same, associated with strontium butyrate, substantially as described.

JOHN H. STEVENS.

Witnesses:
ABRAHAM MANNERS,
RALPH ROOKSBY.